United States Patent [19]

Welsh et al.

[11] Patent Number: 5,084,229
[45] Date of Patent: Jan. 28, 1992

[54] CRITICAL HEAT FLUX TEST APPARATUS

[75] Inventors: Robert E. Welsh, West Mifflin; Marvin J. Doman, McKeesport; Edward C. Wilson, West Mifflin, all of Pa.

[73] Assignee: The United States of America as represented by the United States Department of Energy, Washington, D.C.

[21] Appl. No.: 531,355

[22] Filed: May 31, 1990

[51] Int. Cl.⁵ ............................................. G21C 17/00
[52] U.S. Cl. .................................. 376/257; 376/247; 376/256; 376/253
[58] Field of Search ............... 376/251, 247, 256, 257, 376/253; 373/140, 141, 142

[56] References Cited

U.S. PATENT DOCUMENTS 2,707,719  5/1955  Leibowitz ........................... 373/141
3,995,485 12/1976  Beyer et al. ........................ 374/33

Primary Examiner—Brooks H. Hunt
Assistant Examiner—Meena Chelliah
Attorney, Agent, or Firm—Virginia B. Caress; William R. Moser; Richard E. Constant

[57] ABSTRACT

An apparatus for testing, in situ, highly irradiated specimens at high temperature transients is provided. A specimen, which has a thermocouple device attached thereto, is manipulated into test position in a sealed quartz heating tube by a robot. An induction coil around a heating portion of the tube is powered by a radio frequency generator to heat the specimen. Sensors are connected to monitor the temperatures of the specimen and the induction coil. A quench chamber is located below the heating portion to permit rapid cooling of the specimen which is moved into this quench chamber once it is heated to a critical temperature. A vacuum pump is connected to the apparatus to collect any released fission gases which are analyzed at a remote location.

13 Claims, 1 Drawing Sheet

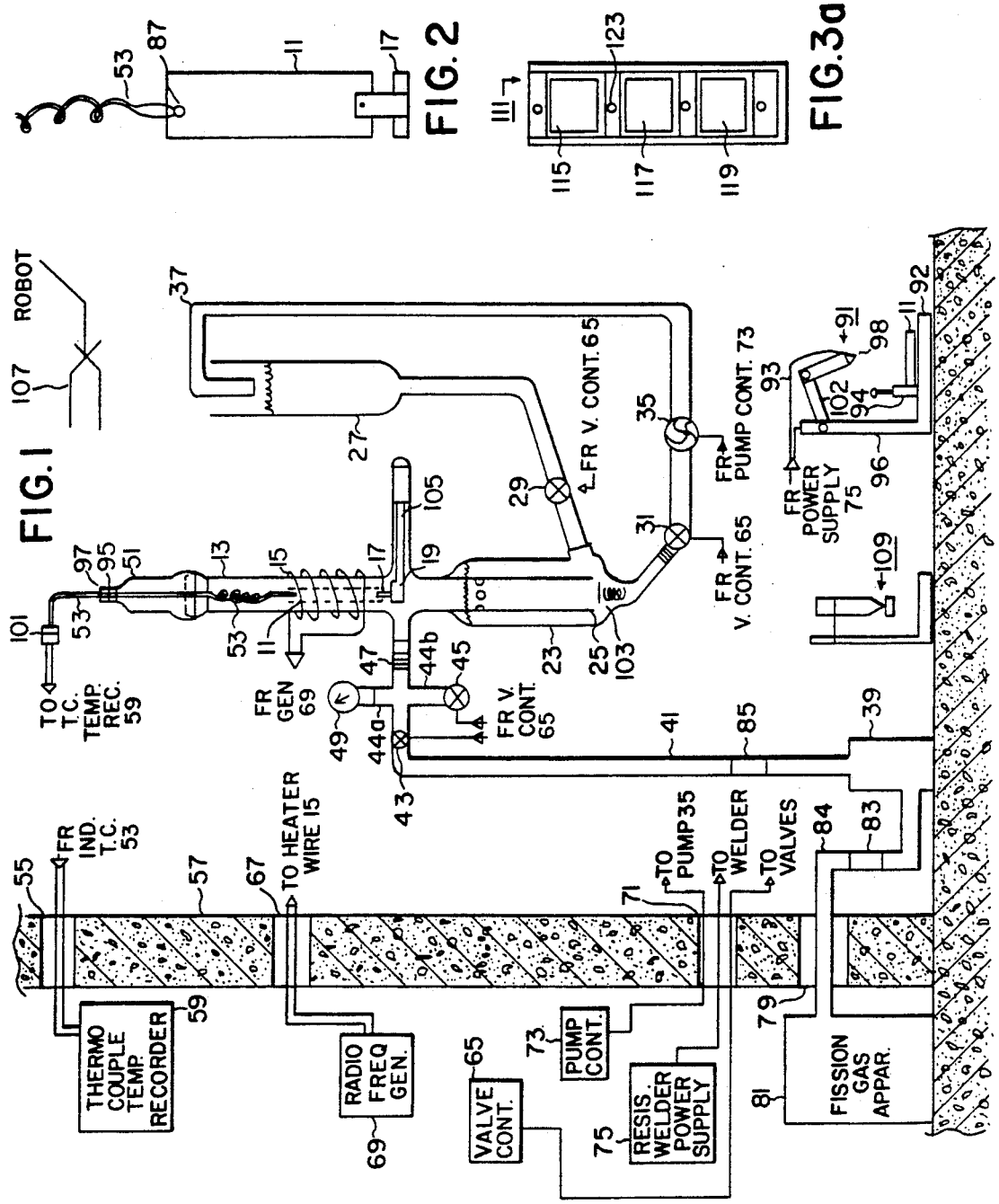

CRITICAL HEAT FLUX TEST APPARATUS

GOVERNMENT CONTRACT

The present invention was conceived and developed in the performance of United States Government Contract DE-AC11-76PN00014.

FIELD OF THE INVENTION

This invention relates to an apparatus for testing a specimen under a high temperature heat transient, and more particularly, relates to such an apparatus which is capable of rapid heating and cooling rates under vacuum conditions to prevent oxidation of the specimen and/or release of entrained gases.

DESCRIPTION OF THE PRIOR ART

It has been important to perform rapidly repeatable heat transient tests on fuel elements for nuclear power plants. These test are used to determine the state of the fuel cells (elements), i.e., the change in the composition of a fuel element as it is used during the fission process. Typically, a sample number of fuel elements are tested from a "bank" of fuel elements loaded at the same time.

In the past, a sampling of fuel elements to be tested have been removed by robot from reactor and placed into a sealed "Hot Cell" testing area. The sampling of fuel elements are then subjected to high temperatures and the gaseous materials released by the fuel elements are analyzed. Each fuel element tested is raised to a critical heat temperature, i.e., the temperature before the sample begins to change state. Once it reaches this temperature it must be rapidly cooled before it can be further handled.

This has been a rather cumbersome and time consuming process which required a substantial area (floor space) of the reactor. Furthermore, the movement of the fuel elements out of the hot cell area creates a handling problem, which in and of itself adds to the time and expense of testing. What is desired is testing apparatus for testing in situ in the hot cell.

An object of this invention is to provide an in situ critical heat test apparatus for fuel elements.

A second object of this invention is to provide this test apparatus with a remotely controlled and powered induction flux heating furnace.

A further object of this invention is to provide this test apparatus with structure to draw off the gaseous materials released when the fuel element is heated and to permit the examining of these gaseous materials at a separate location.

Another object of this invention is to provide this test apparatus with a rapid temperature reduction of hot fuel elements.

A still further object of this invention is to provide this apparatus with structure to permit rapid heating and cooling rates under vacuum conditions to prevent oxidation of the specimen and/or release of entrained gases.

SUMMARY OF THE INVENTION

The objects of this invention are realized in an in situ test apparatus for testing irradiated fuel elements and corrosion coupons within a hot cell to simulate conditions in a nuclear reactor.

A specimen, which has been welded to thermocouple wires and attached to a riser clamp at its lower end and a furnace cap at its upper end, is placed by robot apparatus in a quartz heating tube located within the hot cell. A specimen riser clamp rests upon a movable metal pin which is sealed inside the quartz heating tube. The furnace cap rests on the upper portion of the tube and closes the apparatus.

The quartz heating tube is coupled to an evacuation pipe having a valve which, when opened, allows access through the evacuation pipe to a vacuum pump system. All gas present in the apparatus is evacuated before the apparatus is put into use. Gaseous materials released during the test are collected by a remote apparatus which measures the fission gas collected.

An induction coil around the quartz furnace tube generates heat in the specimen by electrically induced EMF energy. A remote radio frequency generator is used to provide the power to the induction wires.

After the specimen has been heated for a desired time, the metal pin supporting the specimen riser clamp is magnetically removed. The specimen drops into a cooling chamber or quench chamber which is filled with water. This chamber cools the specimen. The quench chamber is supplied with water from a reservoir. The flow of water is controlled with a valve in a circulation tube connecting the reservoir and the quench chamber. Cooling water is circulated from the quench chamber by a remotely controlled circulation pump which pumps the water from the quench chamber to the reservoir.

Because the specimens may be highly irradiated, all operations are capable of being performed in a hot cell by slave manipulators. A welding station and an inspection station are located with the hot cell for making up specimens. A welder power supply, temperature recorder, radio frequency generator, pump control and fission gas collection apparatus are all located outside the hot cell, being connected through the cell wall at one of four cell plugs.

DESCRIPTION OF THE DRAWINGS

The advantages, features and operation of the present invention will be readily understood from a reading of the following Detailed Description of the Invention in conjunction with the accompanying drawings in which like numerals refer to like elements and in which:

FIG. 1 is a block diagram of the test apparatus and welding and inspection apparatus;

FIG. 2 is a plan view of the prepared specimen;

FIG. 3 is a side elevational view of a multiple corrosion specimen holder; and

FIG. 3a is a plan view of the top holder portion of the holder of FIG. 3.

DETAILED DESCRIPTION OF THE INVENTION

An apparatus, FIG. 1, for testing fuel element specimens and corrosion coupons at high temperature transients is provided. The apparatus raises a specimen to its critical heat temperature by electrical flux induction. This critical heat flux (CHF) test apparatus is located in a hot cell so that highly irradiated specimens, i.e. fuel elements, can be tested in situ. All operations are performed remotely within a hot cell using a slave manipulator or robot 107.

A specimen 11 is placed within a quartz tube 13 which has one upper heating portion where induction wires 15 are coiled around its exterior surface. The lower end of specimen 11 is attached to a riser clamp 17.

This specimen riser clamp 17 rests upon a movable metal pin 19 which supports the specimen 11 while it is in the heating portion of the quartz tube 13 (the region of the induction coil 15).

Below the heating portion of the tube 13 is a cooling portion or quench chamber 23. The base of this cooling portion 23 is provided with a shock absorbing spring 103. The coolant 25, usually water, fills the quench chamber 23 and is supplied to this quench chamber 23 from a reservoir 27 connected to the chamber 23 by a pipe having a flow control valve 29. At the base of the quench chamber 23 is a coolant return valve, circulation valve 31.

The system valves 29 and 31 can be solenoid operated or motor position (servo motor) controlled from a remotely located valve control 65. Control signal lines connect this valve control 65 and the valves 29 and 31. The coolant circulation valve 31 connects the quench chamber 23 to a reservoir 27 through piping 37. A circulation pump 35 positioned in this piping 37 forces the water coolant from a lower level below the quench chamber 23 to an upper level where the reservoir 27 is positioned. The reservoir 27 is high enough to gravity pressure feed the quench chamber 23 through piping containing the valve 29.

The quartz tube 13 is connected to a moisture trap 39 by an evacuation tube 41 attached at a coupling 85, which KOVAR transition coupling 47 is connected to the quartz tube 13. Access through the tube 41 is controlled by a valve 43 in the tube 41. The coupling 47 meets the tube in the region of the movable metal pin 19 below the region of the induction heating coils 15. The evacuation tube 41 and moisture trap 39 is connected to the vacuum system of the fission gas collection apparatus 81 exterior to the hot cell by a connector 83. A pair of vent pipes 44a and 44b connect into the evacuation tube 41 between the coupling 47 and the valve 43.

A system vent valve 45 is connected to the lower vent pipe 44b of the evacuation tube 41. This vent valve 45 is closed during testing, i.e., during the heating and cooling of the specimen 11 and opened before the CHF apparatus is opened to remove the specimen 11. Also connected to the evacuation tube 41 at the upper vent pipe 44a is a pressure gauge 49 for monitoring the CHF apparatus pressure while it is in operation.

The CHF apparatus is closed with a furnace cap 51 placed over the open top of quartz tube 13. A thermocouple 87 is welded onto the specimen 11. Coiled wires 53 are welded to the thermocouple 87 and extend from the weld junction through the furnace cap 51 and to a first cell plug 55 through the hot cell wall 57. These wires 53 are connected through that cell plug 55 to a thermocouple temperature recorder 59.

Power cables from a radio frequency generator 69 located outside the hot cell pass through a second cell plug 67 and extend across the hot cell to power the induction coils 15. A third cell plug 71 is used as a passageway through the cell wall 57 for signal wires from an external pump control 73 to the coolant pump 35. Power cables 93 from a resistance welder power supply 75 are also passed through this cell plug 71 to a welder 91 located in the hot cell. A fourth cell plug 79 is used to pass a pipe 84 to a fission gas apparatus 81 from the moisture trap 39. This pipe 84 is provided with an adapter union connector 83 to interface with the fission gas vacuum system 81.

The remotely powered welder 91 within the hot cell has a base 92 which rests on the hot cell floor and holds the specimen 11 with a vise member 94. A vertical arm 96 holds the resistance welder tip 98 on a dual link pivoted positioning arm 102.

A small grinding tool 109 is positioned within the hot cell adjacent the welder 91. This grinder 109 is used to prepare the surface of the specimen 11 prior to welding the thermocouple in place.

The furnace cap 51 mates with the quartz tube 13 with a spherical socket. The thermocouple wire 53 extends through the furnace cap 51. The top of the furnace cap 51 has a KOVAR seal 95 and KOVAR cap 97. The thermocouple wires 53 extend through KOVAR seal 95, the KOVAR cap 97 and are surrounded by a solder and epoxy seal. These thermocouple wires 53 extend to an electrical coupling 101 and then through the first cell plug 55 to the thermocouple temperature recorder device 59 which is located outside the cell wall 57.

A specimen 11 is prepared, FIG. 2, in the hot cell, by grinding away its corrosion film in the weld area. A previously prepared thermocouple 87 is welded to the specimen 11, at a point near its top so that the specimen hangs straight from the wire 53 attached to the thermocouple 87. The wires 53 are braided and coiled to allow vertical displacement when dropped into the quench chamber and may be a chromel-alumel combination. The thermocouple junction 87 is Heliarc welded to prevent oxidation. The specimen 11 and thermocouple assembly 87 are attached to a specimen riser clamp 17. The purpose of the clamp 17 is to position specimen 11 within the induction coil 15.

A special holder 99, FIG. 3, is used to test multiple corrosion coupons without damaging the corrosion films. It has a top holder portion 111 and a base 113. The base 113 of this special holder 111 has a cross shaped cross section.

This holder 99, top portion 111, FIG. 3a, has three rectangular depressions 115, 117, 119 for holding individual coupon specimens. Separating the three depression regions 115, 117, 119 are flat portions, elevated to a height above the depression regions 115, 117, 119. Extending from the center of each of the flat portions is a projection 123. A cover 121 is adapted to fit over the depression containing the top portion and is provided with openings through which the projections 123 extend.

Three separate compartments are formed from the three depressions 115, 117, 119. It is within these compartments that corrosion film individual coupon specimens are placed for testing. The coupon in the top position is then welded with a thermocouple and the holder is placed in the CHF apparatus in the same manner in which the specimen 11 was prepared and placed in the CHF apparatus.

The CHF apparatus is closed when the furnace cap 51 is placed atop the quartz tube 13. The system vent valve 45 is closed and the valve 43 to the evacuation tube 41 opened so that the CHF apparatus is evacuated. Thereafter, the system is sealed by closing the valves.

Maximum power is applied to the induction coil 15 by the radio frequency generator 69 to achieve the initial heat up rate. Power is decreased to hold the specimen 11 at a predetermined dwell temperature and time. The apparatus can heat a specimen 11, such as a fuel element, to 1300 degrees F. (704 degrees C.) at rates up to 120 degrees F./sec (49 degrees C./sec).

Each specimen has a different temperature at which its substructure will be permanently altered. This temperature is a function of the critical heat of the element. This apparatus is designed to quickly raise the temperature of the specimen and then rapidly cool it, so the effects of exposure to a high temperature for a predetermined time can be studied dimensionally, by metallography and by examination of the by-products driven off of the element and collected by the vacuum apparatus. In this way, the various stages and changes in the structure of a specimen, i.e., phase transformations, can be plotted over time and temperature and the order and manner in which the structural changes occur studied.

When power to the coil 15 is turned off, the metal support pin 19 is remotely removed by a magnet device 105 causing the specimen 11 to drop into the lower quench chamber 23 of the apparatus. As the specimen 11 is cooled, the system is monitored for potential fission gas release, that is, the gas released if the integrity of the specimen is compromised. The specimen is cooled at rates up to 300 degrees F./sec (149 degrees C./sec). Any gases released are collected through the evacuation tube 41.

After a test, the system is vented by opening the vent valve 45 and the specimen 11 withdrawn by a slave manipulator 107 which removes the cap 51 and which grasps the thermocouple wires 53 attached to the specimen 11. This procedure can be repeated immediately if it is so desired or the specimen may be transferred to another station for examination.

This CHF apparatus is particularly adapted to perform rapidly repeatable heat transient tests on model fuel elements and can be modified to permit testing of a variety of other materials, both irradiated and non-irradiated.

Modifications can be made to the above-described invention without departing from the intent and scope thereof. Accordingly, it is intended that the scope of the invention is not to be limited by the foregoing description. The above description is to be considered as illustrative of the invention.

What is claimed is:

1. A critical heat test apparatus for testing fuel elements and other irradiated materials in situ within a hot cell, said hot cell having a remotely controlled positioning device, comprising:
   an evacuated heating chamber, said chamber being adapted to hold a test specimen;
   an induction heater, disposed about the outer surface of the heating chamber for inducing EMF flux waves within the heating chamber;
   a specimen temperature sense apparatus, said specimen temperature sense apparatus being attachable to a specimen held within said heating chamber;
   an evacuation device, being coupled to said heating chamber at the base thereof; and
   a quench chamber, said quench chamber being located below said heating chamber and opening thereinto.

2. The test apparatus of claim 1 wherein the apparatus includes a holding device, said holding device being a movable metal pin in an orthogonally outwardly extending arm of the apparatus, wherein said holding device holds a specimen in the heating chamber and above the quench chamber.

3. The test apparatus of claim 2 also including a coolant reservoir positioned at a level above said quench chamber, a first upper pipe connecting said reservoir to said quench chamber a second lower return pipe connecting said water jacket to said reservoir and a circulation pump positioned within said second pipe.

4. The test apparatus of claim 3 wherein said upper and lower pipes have a respective first and second circulation valve therein by which to control the flow into and out of said quench chamber.

5. The test apparatus of claim 4 also including an evacuation pipe coupled to said heating chamber and a moisture trap coupled to said evacuation pipe.

6. The test apparatus of claim 5 also including a fission gas vacuum apparatus for analyzing the gas released, being connected to said moisture trap.

7. The test apparatus of claim 6 also including an upper vent pipe and a lower vent pipe, said upper and lower vent pipes being juxtaposed on either side of said evacuation pipe, a pressure gauge mounted on said upper vent pipe, and a vent valve mounted on said lower vent pipe.

8. The test apparatus of claim 7 also including a specimen temperature recorder connected to said specimen temperature apparatus, a radio frequency generator connected to power said induction heater, a valve control connected to said first and second circulation valves, and a pump control connected to said circulation pump.

9. The test apparatus of claim 8 wherein said evacuated heating chamber is a quartz tube.

10. The test apparatus of claim 9 wherein said induction heater includes a water cooled coil around the outer surface of the heating chamber.

11. The test apparatus of claim 10 wherein the specimen temperature sense apparatus includes a thermocouple in contact with a specimen when said specimen is located in said heating chamber.

12. An apparatus for performing a critical heat flux test on a specimen, comprising:
   a quartz tube having an open-ended upper heating portion, a closed lower cooling portion, and an arm extending orthogonally outwardly at a location between the heating and cooling portion of the quartz tube, and an open extension located opposite said arm;
   a quench chamber, said chamber having an inlet and an outlet and being completely disposed about the quartz tube cooling portion;
   a movable support means, said means being sealed within said arm of the quartz tube and being operable therein to hold a specimen in the quartz tube heating portion and to release the specimen to move it into the quartz tube cooling portion;
   an oscillating flux induction heater located about said heating portion for inducing oscillating flux paths through said heating portion;
   a reservoir, said reservoir including a first pipe connected between said reservoir and said inlet of said coolant chamber and a second pipe connected between said reservoir and the outlet of said coolant chamber, wherein said reservoir provides a coolant liquid to said chamber by said first pipe and the coolant liquid is returned to said reservoir by said second pipe; and
   means for evacuating the quartz tube, said means being connected thereto at said open extension portion thereof.

13. The apparatus for performing a critical heat flux test of claim 12, including a temperature sensing means, said temperature sensing means being located within said heating portion of said quartz tube for sensing the temperature of a specimen held therewithin.

* * * * *